United States Patent [19]

Ruggeri

[11] 4,104,716
[45] Aug. 1, 1978

[54] SATURABLE MAGNETIC DEVICE FOR REGULATING COMMUTATING OR CONVERTING AN ELECTRIC CURRENT FROM AC TO DC OR VICE VERSA

[76] Inventor: Luigi Ruggeri, Via Mosé Bianchi, 40 - Milan, Italy

[21] Appl. No.: 713,602

[22] Filed: Aug. 11, 1976

[30] Foreign Application Priority Data

Aug. 13, 1975 [IT] Italy ............................. 26329 A/75

[51] Int. Cl.² ............................................. H02M 5/32
[52] U.S. Cl. ............................... 363/102; 323/89 MS; 363/140
[58] Field of Search ............... 321/8 R, 25, 28, 62; 323/89 R, 89 MS; 363/102, 140

[56] References Cited

U.S. PATENT DOCUMENTS

| | | | |
|---|---|---|---|
| 2,769,138 | 10/1956 | Obermaier | 321/25 |
| 3,011,118 | 11/1961 | Brandt | 321/25 |
| 3,237,084 | 2/1966 | Krasnow | 321/28 |
| 3,443,198 | 5/1969 | Wanlass | 321/25 |

*Primary Examiner*—William M. Shoop
*Attorney, Agent, or Firm*—Haseltine, Lake & Waters

[57] ABSTRACT

An electric current regulation, commutation and conversion device, which is particularly adapted for current regulation and commutation in rotating direct current electrical machines and for converting alternating current into direct current or vice versa. At least one conductor is disposed in at least one slot in a ferromagnetic lamination pack, the shape of the conductor cross-section and its arrangement in the slot being such as to intensify the additional resistance caused by the dispersion flow due to the current running therethrough. The magnetic circuit constituted by the lamination pack and linked to the current in the conductor is such as to minimize the inductance of the conductor, and the walls of the conductor containing slot are of such a form and arrangement as to be able to be saturated by an external magnetic control field superimposed on the magnetic field due to the current in the conductor.

4 Claims, 18 Drawing Figures

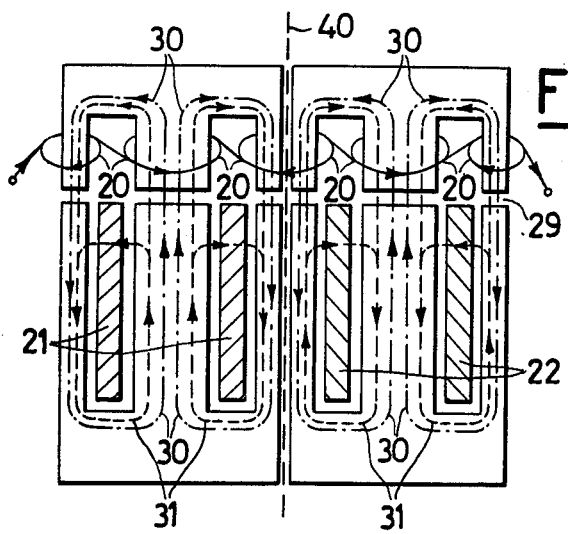
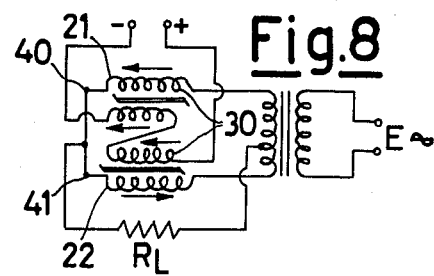
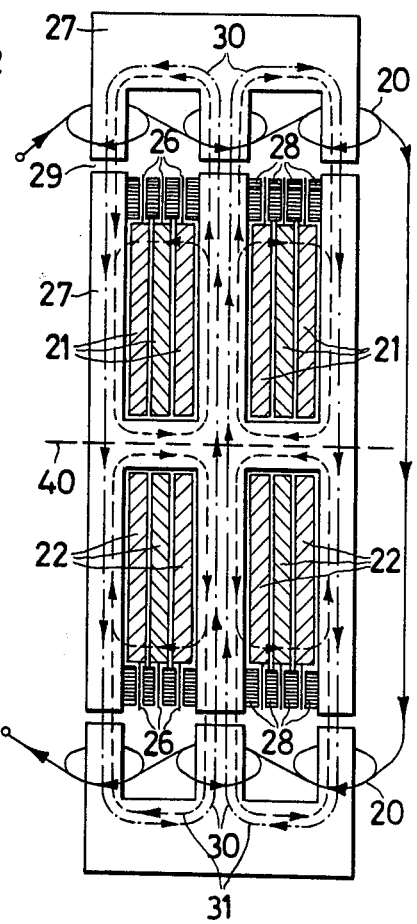
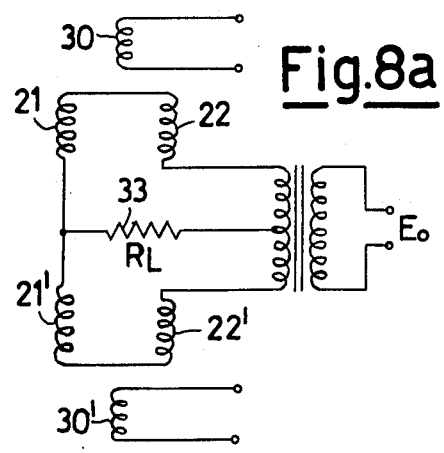

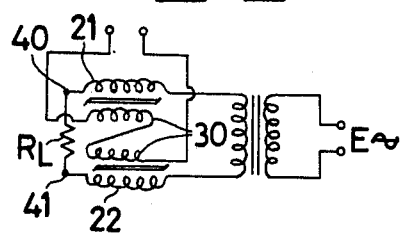
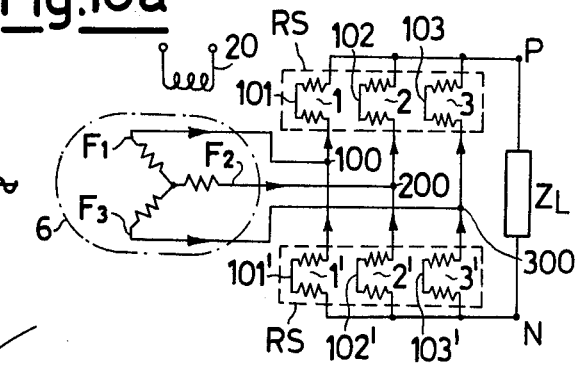
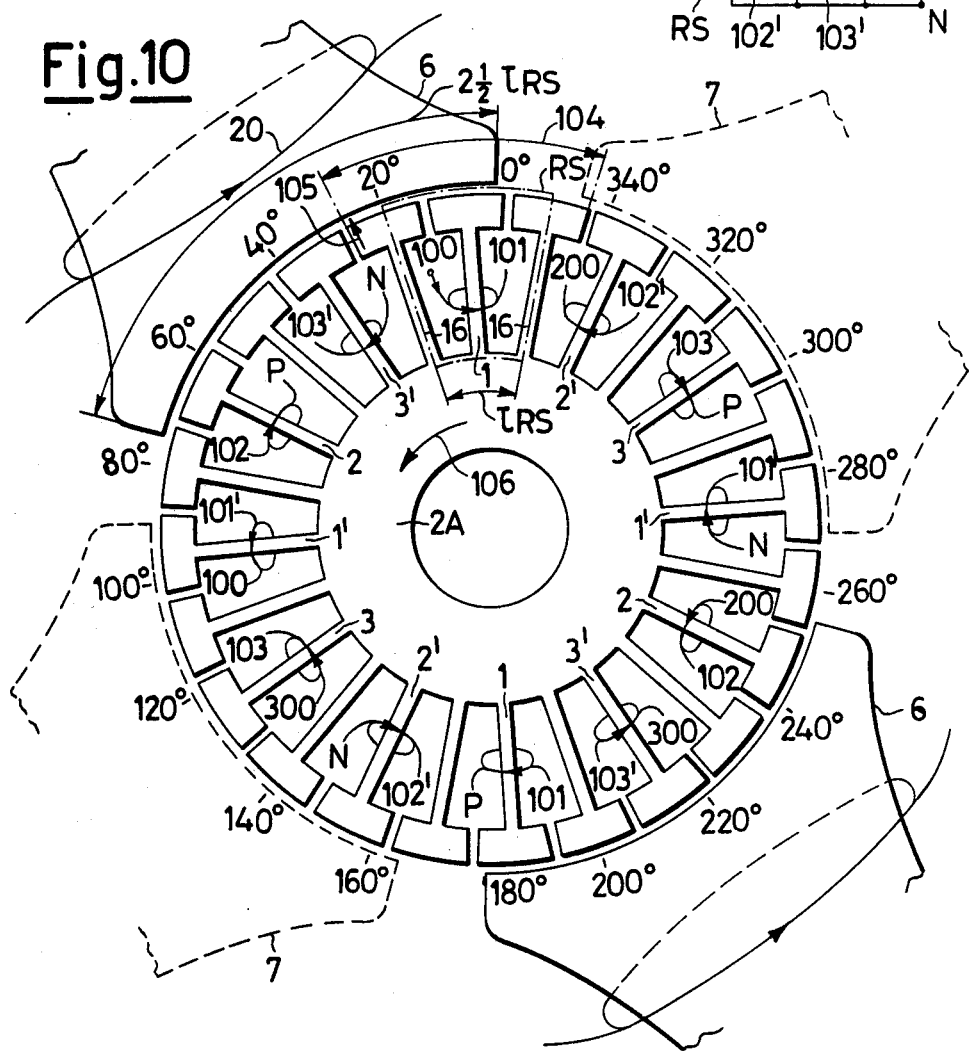

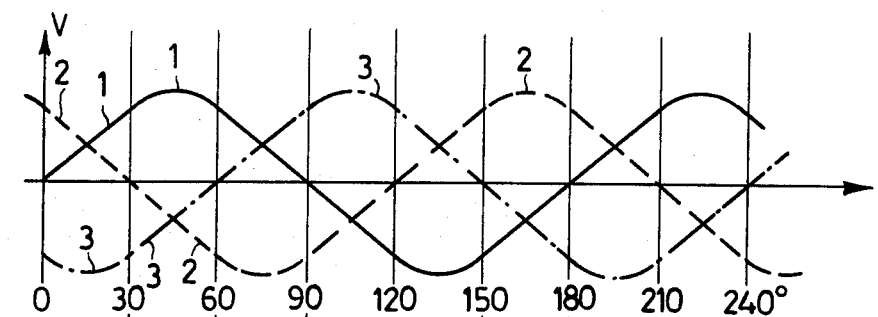
Fig.11
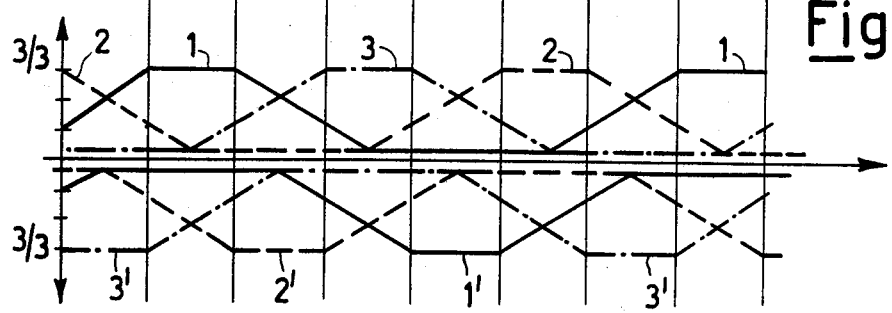
Fig.12a
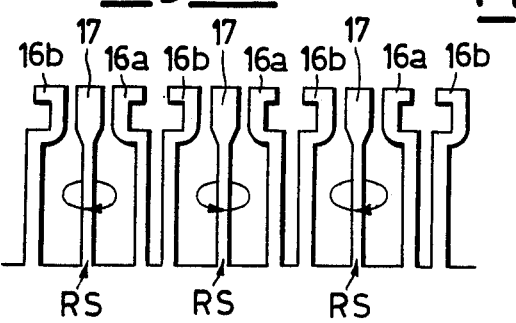
Fig.12b
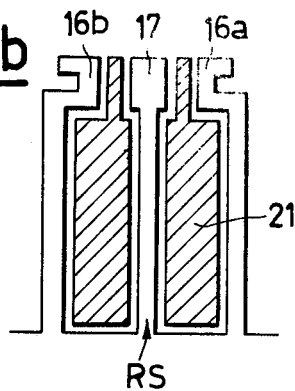
Fig.13
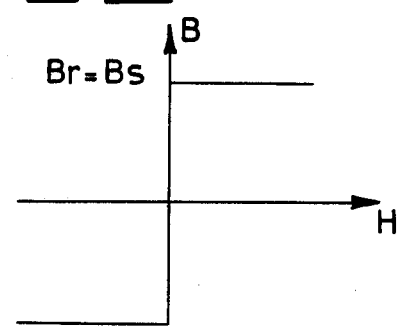
Fig.14
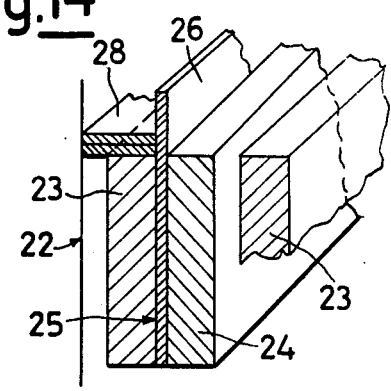

SATURABLE MAGNETIC DEVICE FOR REGULATING COMMUTATING OR CONVERTING AN ELECTRIC CURRENT FROM AC TO DC OR VICE VERSA

An electric current regulation device particularly but not exclusively for current regulation and commutation in rotating direct current electrical machines, and for converting alternating current into direct current or vice versa.

A brief examination will firstly be made of the various current regulation devices of the known art, their facility for providing commutation, and the disadvantages which the invention means to obviate.

The most simple method of regulating electric current circulating in a circuit notably consists of varying the value of an electrical resistance in series with the current. This variation may be obtained gradually by a mechanical sliding contact which progressively connects into or disconnects from the circuit the required portion of resistance, or may be obtained discontinuously by a mechanical switch or commutator which connects or disconnects resistances or discreet resistance portions into or from the circuit or switches them over from one circuit to another.

In the limiting case, both these regulation systems comprise the making or breaking of the circuit by a switch. This in fact happens when the regulating resistance is varied from its minimum value (which in the limit may be zero) to its maximum value (which in the limit may be infinite) or vice versa. In the case of two circuits, these systems also comprise current switch-over from one circuit to the other.

In this latter case, the operation of the commutator is equivalent to making the regulating resistance of one of the circuits infinite and the regulating resistance of the other zero. This also applies to commutation in direct current machines and electrical converters with mechanical contacts. When applied to these rotating machines, the term "commutation" is commonly used to indicate more specifically the periodic transfer of current from one to the other of two or more internal machine circuits in cyclic succession and in synchronism with the generated voltage (in the case of a generator), or the supply voltage (in the case of a motor and converter) for rectifying purposes, notably to allow the half waves of one polarity to be conducted and those of opposite polarity to be blocked.

The aforementioned known regulation and commutation systems and the mechanical members which effect them have the disadvantage of giving rise to sparking, arcing and strong localized heating in the sliding or make and break contacts of the circuit, with consequent wear and need for maintenance.

These disadvantages are greater the greater the currents and powers concerned, and consequently limit the field of application of the described devices.

A further known arrangement for regulating the electric current in a circuit is to connect a saturable inductance in series with the circuit to be regulated. In such a case, because of the absence of mechanical contacts in the circuit, the aforementioned disadvantages are eliminated, but the inductance connected into the circuit reduces its power factor, so causing undesirable circulation of reactive power. This requires over-dimensioning of the circuit members and worsens its regulation time constant.

Furthermore, because of the impossibility of making the flow of reactive power unidirectional, it is not possible to utilize the saturable reactor as a synchronous switch, with commutation for rectifying purposes.

A further regulation method offered by the known art consists of semiconductors. These devices eliminate all the aforementioned disadvantages and have the further advantage over the other aforesaid devices of very small size and weight.

However, because of the small weight, these advantages are accompanied by the disadvantage of low thermal capacity and poor heat dissipation capacity, because of which even relatively small heat quantities which develop in the semiconductor due to overloads or overvoltage in the circuit into which it is connected can easily lead to destructive temperature increases.

This means that the semiconductor has to be overdimensioned, be provided with dissipators which increase its weight and size without totally solving the problem (because the heat necessarily takes a finite time to pass from the semiconductor junction to the dissipator), be provided with an effective ventilation system, for the most part forced, and be provided with costly rapid acting fuses to cut the faulty element out of the circuit and prevent the fault progressing to the other elements, in the case of several elements in series or parallel.

The use of semiconductors also leads to the following further problems, which are different according to whether uncontrolled or controlled diodes are used (transistors will not be considered as they are unusable in high power applications to which the present invention refers).

Uncontrolled diodes can be used for commutation and rectifying but not for regulation.

This latter is obtained by using any of the aforementioned devices (affected by the said disadvantages) added to the diodes, or by acting on the energization of the supply generator if accessible. However in this case the regulation speed is influenced by the generator time constant. The use of controlled diodes or thyristors notably eliminates this disadvantage by allowing regulation downstream of the generator, but introduces the following problems and limitations: the control circuit is relatively complex; the regulated voltage is affected by strong ripple with a corresponding worsening of the power factor; forced change-over from the conducting to the locked state is obtainable only by suitable relatively complex auxiliary extinguishing circuits.

A further disadvantage of the controlled semiconductor is that the input or control circuit must be electrically connected to the output circuit. This disadvantage for example prevents the use of a rotating controlled diode rectifier in a brushless exciter (without using special arrangements which introduce further complications), a use which would be desirable to allow rapid deenergisation by output voltage inversion. (This inversion is not obtainable with an uncontrolled diode rectifier).

The object of the static regulation device according to the present invention is to obviate these disadvantages in the aforementioned and other analogous applications.

It consists of one or more regulator and rectifier elements, each comprising at least one conductor disposed in at least one slot in a ferromagnetic lamination pack, the shape of the conductor cross-section and its arrangement in the slot being such as to intensify the additional resistance caused by the dispersion flow due to the current running through it, the magnetic circuit constituted by the lamination pack and linked to the current in the conductor being such as to minimise the inductance of the conductor, and the walls of the slot containing said conductor being of such a form and arrangement as to be able to be saturated by an external magnetic control field superimposed on the magnetic field due to the current in the conductor.

The invention regulates and rectifies the current in the conductor by saturating the walls of the slot to an appropriate extent and with an appropriate frequency, by said external magnetic field superimposed on the field of the current to be regulated.

The characteristics of the present invention will be more evident from the detailed description given hereinafter of some embodiments illustrated in the accompanying drawings, in which:

FIGS. 6 and 7 are two examples of static regulation devices using the basic constituent element of the present invention;

FIGS. 8, 8a and 9 show the electrical schematics of three regulators using physical structures such as those of FIGS. 6 and 7;

FIGS. 10 and 10a show the physical structure and electrical schematic respectively of a dynamic rectifier and regulator including the basic constituent element of the present invention;

FIG. 11 is a graph indicating the variation in the conductance of the saturable elements as a function of the degrees of rotation in the regulator of FIG. 10;

FIGS. 12a and 12b are modifications of the core form of the saturable elements of FIG. 10;

FIG. 13 shows the ideal magnetic characteristics for the magnetic material forming the walls of the basic element of the invention;

Figure 1A:
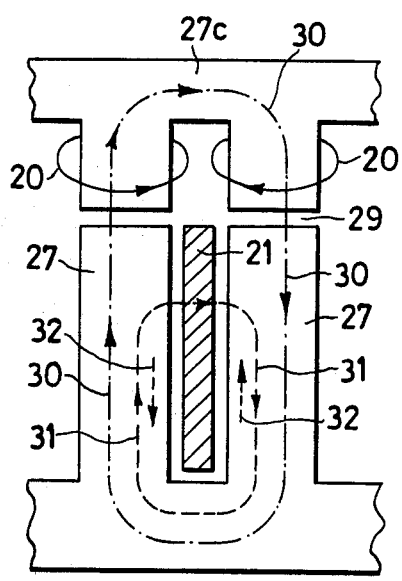
FIGS. 1a and 1b are two embodiments of the basic constituent element of the present invention.
Figure 1B:
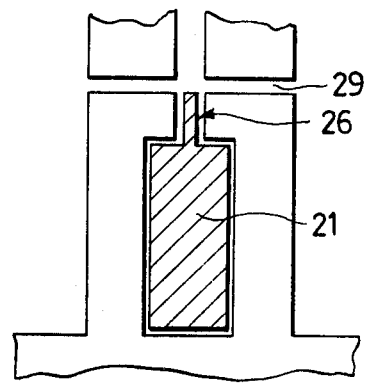

FIG. 14 shows one embodiment of the conductors 21 and 22 of FIGS. 1b, 7 and 12.

FIG. 1a is a cross-section through the basic constituent element of the invention, comprising a conductor 21 for passage (in a direction perpendicular to the plane of the drawing) of the load or output current to be regulated or rectified, a ferromagnetic lamination pack 27 (of which the figure shows one general layer) which contains it, and preferably but not necessarily an air gap 29. The core 27 has a cross-section and arrangement such that it can be saturated by the magnetic flux 30 of an input winding (control or regulation) linkable to the same magnetic circuit as the flux produced by the load current. This input winding is shown diagrammatically in FIG. 1a by one or more turns 20 which are additive. The device has two main modes of operation, defined hereinafter according to the control ampere turns.

Figure 3:
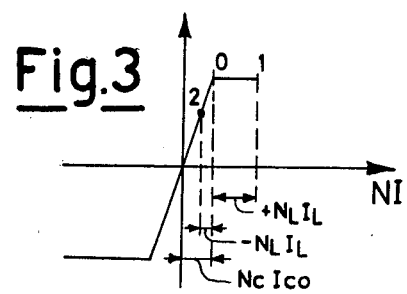
FIG. 3 shows the magnetization characteristic of the magnetic circuit in the mode of operation of FIGS. 1a and 1b.
Figure 5:
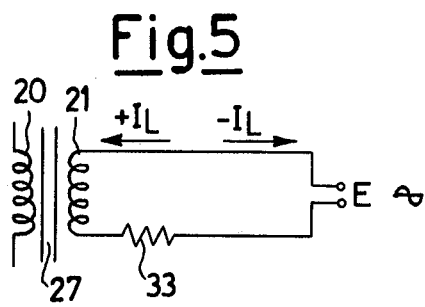
FIG. 5 shows the electrical schematic of one possible method of using the basic element of FIGS. 1a, 1b and 2.

If $N_c I_c$ = control ampere turns;
$N_L I_L$ = load ampere turns;

$N_c I_{co}$ = control ampere turns necessary to bring the operation point of the cores, in the absence of load ampere turns, to point O of FIG. 3 corresponding to the upper bend of the magnetization characteristic, then in the first mode $N_c I_c = N_c I_{co}$. In this case the control ampere turns are in the nature of ampere turns of polarization and give the device a rectifying function. It will be considered by way of example that the device of FIG. 1a is connected into the circuit of FIG. 5, where E is the alternating supply voltage of the load circuit, 33 is the load resistance and the other reference numerals are as in FIG. 1a. It will be assumed that the alternances of E which produce load ampere turns additive to or subtractive from the control ampere turns are additive or subtractive respectively. $+I_L$, $-I_L$ are additive and subtractive alternances of the load current respectively.

The additive load ampere turns when superimposed on the polarisation ampere turns displace the point of operation of the cores towards the saturated branch (e.g. at 1, FIG. 3) while the subtractive alternance (e.g. negative) of these displaces it towards the desaturated branch (e.g. at 2).

Consequently, in the first case the walls 27 of the slot become saturated, leading to a reduction in the transverse flux in the slot (of which the figure shows one general line 31), this flux being due to the current circulating in the conductor 21, therefore leading to a reduction in the additional resistance due to the parasite currents induced by said flux. The conductor is then in a condition of maximum conductivity.

In the second case, i.e. in the presence of a subtractive alternance of the load current, the walls of the slot remain desaturated, and offer minimum reluctance to the transverse dispersed flux lines in the slot 31. This makes the transverse flux a maximum and therefore the additional resistance due to the intensifying of the current induced by said transverse flux in the conductor 21 also a maximum. The conductor is therefore in a condition of minimum conductivity with respect to this subtractive alternance.

The device described in FIG. 1a therefore acts as a rectifier element. The locking resistance, i.e., the resistance opposing the subtractive alternance, is due to the ununiform intensification of the current in the cross-section of the conductor, caused by the transverse dispersed flux in the slot. This locking resistance may therefore be considerably increased (to the advantage of the conversion efficiency, or to reduce the reverse current which the device allows to pass to within allowable limits for the scheduled application) by using those arrangements of the known art used for increasing the starting resistance in condensation or double cage induction machines. The additional resistance may be considered a linear function of the dimension (of cross-section) perpendicular to the dispersed flux, and a function of the square root of the frequency for sufficiently high values of these two parameters. Thus it is convenient to use deep slots and conductors 21 with their sections extending in a direction perpendicular to the dispersed flux.

It is also advantageous to use a sufficiently high supply frequency. An even greater intensification of the locking resistance is obtained by using a section with a narrow appendix on the air gap side (where the current density is greater), such as an inverted T section (FIG. 1b) or an L section, or any other of the equivalent forms used in the known art for current condensation motors. For the purposes of the present invention, the thickness of the narrow section (26, FIG. 1b) should be as small as practically possible to increase the locking resistance.

Besides intensifying the additional resistance, these arrangements also generally lead to improvement of the R/X ratio. This improvement is also aided by the air gap 29 (FIGS. 1a, 1b, 2) and the use of open or semiopen slots instead of closed.

The expedient of dividing and totally or partially transposing the conductor, commonly used to reduce additional losses, can in the case of sufficiently high values of slot height and frequency give rise to the opposite result for which division is normally used, i.e., to an increase instead of a reduction in the additional resistance, and can therefore also be used to intensify the effect on which the present invention is based.

By varying the polarization ampere turns or superimposing thereon regulation ampere turns $N_c I_{cr}$ which displace the no-load point of operation of the cores from the bend O of FIG. 3, the device also gives regulation of the rectified current in addition to rectification. By lowering the no-load operation point, both the direct component and the harmonics superimposed thereon are reduced. By displacing it towards the right (with respect to O of FIG. 3) the direct component is reduced and the alternating component is increased. In this region of operation, namely where $N_c I_{cr}$ is positive and lies between zero and $N_L I_L$ (where $N_L I_L$ is the load ampere turns) the device operates for alternating current as a variable inductive resistance with static means, i.e., without mechanical contacts.

This static device differs from known types of saturable reactors in two fundamental concomitant ways.

a. the resistive component of the varible impedance thus obtained is made prevalent over the reactive component;

b. its power factor remains practically constant as the impedance varies as a function of the control current, over the entire field of operation.

This is a consequence of the fact that the resistance of the output conductors is suitably intensified with respect to the inductance and is made a function, as this latter, of the sum of the load and control ampere turns by the arrangements heretofore described.

FIGS. 6 and 7 show two examples of a static regulation device of the parallel magnetic circuit (FIG. 6) and series magnetic circuit (FIG. 7) types respectively. For simplicity of representation, single phase versions are illustrated. In the examples shown, the output winding is a double winding, i.e., it consists of one section wound in the additive direction and another section wound in the subtractive direction with respect to the control flux, in order to neutralize the odd harmonics introduced into the control winding.

However a single output winding could equally be used, considering the small value of the voltage induced by said harmonics, this smallness due to the prevalence of the resistive component.

The regulated alternating current is obtained between points 40 and 41 of the schematic in FIG. 8, because of which for its operation as an alternating current regulator the schematic is modified as in FIG. 9.

For its rectifying function, the described element may be used as a component in any conventional single phase or polyphase rectifier circuit. FIGS. 6 and 7 show by way of example two embodiments of the full wave single phase rectifier circuit, the schematic of which is shown in FIG. 8. The windings 21 and 22 consist of conductors which, when traversed by a positive alternance of the supply E, generate a flux additive to or subtractive from the control flux 30 respectively.

Consequently when the iron adjacent to 21 goes into saturation (general point 1 of FIG. 3) and makes the conductivity of 21 a maximum, the iron adjacent to 22 becomes desaturated (general point 2 of FIG. 3) and makes the conductivity of 22 a minimum.

During the negative alternance, the contrary happens, i.e. 22 becomes additive and 21 subtractive.

FIGS. 6 and 7 differ by the fact that in the former the windings 21 and 22 are in parallel and in the latter they are in series relative to the control flux. Furthermore, in FIG. 7 both these windings are, by way of example, assumed to consist of three turns in series and connected in series together by conventional conections, now shown in the drawing. For ease of construction, an inverted T section may be used for each turn, as shown in FIG. 14 or formed from two (or more) plates 23 and 24 of copper or other conductive material, between which a copper strip 25 is inserted or possibly welded to form a simple electrical contact, its projection 26 forming the narrow part of the turn section. The same T section could also be obtained in a single piece by drawing, bending or any other manufacturing process. Conventional insulation, not shown in the figure, is placed between one turn and another, and between the turns and cores. In FIGS. 6 and 7, the magnetic lamination cores surrounding the conductors 21 and 22 are indicated by 27, the input winding by 20, the lamination strips filling narrow sections (also insulated from the conductor) by 28, the air gap by 29, the path of the control flux by 30 and the path, at any instant, of any transverse dispersed flux line of the output winding by 31.

Figure 4:
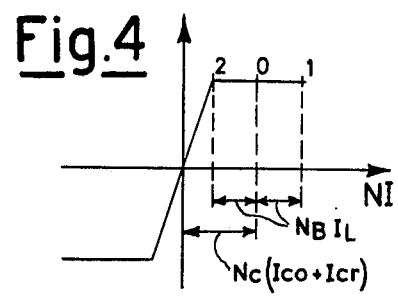
FIG. 4 shows the magnetization characteristic of the magnetic circuit in the mode of operation of FIG. 2.

The second main operation mode of the elementary device shown in FIG. 1 and its examples of application (FIGS. 6 and 7) is obtained by applying to the control winding 20 the ampere turns $N_c (I_{co} + I_{cr})$ (FIG. 4) alternating at a frequency of one half (or an even submultiple) of the supply frequency of the output circuit, instead of constant as in the first mode.

This is obtained either by supplying the control winding 20 with an alternating voltage instead of a direct voltage, or by cyclically coupling and decoupling that part of the core 27c which houses the control winding 20, relative to the rest of the core 27 which contains the output windings.

In both cases the walls of the slots containing the output windings are cyclically saturated and desaturated by the inducing flux, and the additional resistance due to the transverse dispersed flux varies cyclically from a minimum to a maximum as the saturation conditions (within the inductor field) and desaturation conditions (outside the inductor field) of the slot walls alternate.

As stated, this alternance of values of the additional resistance influences the state of conduction of the output windings, in the sense of preventing their conduction when the additional resistance is a maximum and allowing nearly full conduction when the additional resistance is a minimum.

This second mode of operation differs from the first from the operational point of view in that the windings 21 and 22 of FIGS. 7 and 8 simultaneously reach the conducting state in one half period, and the locked state in the next half period, instead of one being in conduction and the other locked simultaneously, as in the previous mode.

To construct the schematic of FIG. 8, it is therefore necessary to separate the core into two along the dashed line 40, and supply the two halves at control voltages which are in mutual quadrature. Another obvious solution is to use two devices such as in FIG. 7 (or FIG. 8) instead of one, i.e., one for each half wave and connect them as in the schematic of FIG. 8a. The advantage of this method over the preceding is the neutralizing of the odd harmonics introduced into the control winding, as is already done in the known art in series saturable reactors.

Figure 2:
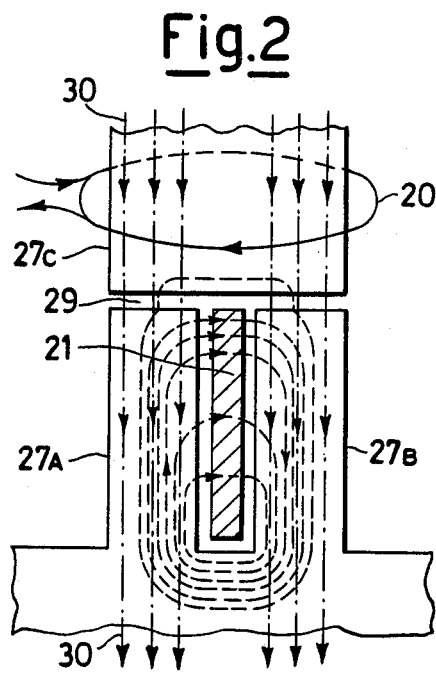
FIG. 2 is a modification of the same basic element, with a different manner of operation.

In both cases, the second mode of operation allows the elementary device of FIG. 1 to be constructively simplified by converting it into that shown in FIG. 2, in which the control flux traverses in parallel instead of in series the two cores which flank the output conductor or conductors. The consequence of this is that the flux from the output current is additive to the control flux in the right hand wall, and simultaneously subtractive in that of the left hand wall (or vice versa), but this does not alter the second mode of operation, whereas evidently it would prevent the first mode of operation because it would make it impossible to simultaneously saturate the two walls during one half period and desaturate both of them during the next.

As already stated, the cyclic variation in the control ampere turns in the second mode of operation may be obtained by mutually dephasing the supply voltages of 30 and 30' by 90°, or by mechanically and cyclically coupling and decoupling that part of the core housing the winding 27 to and from the core containing the output windings. This may be obtained by a rotor and stator structure similar to that of a rotating electrical machine.

FIG. 10 shows by way of non-limiting example a structure of this type corresponding to the schematic of FIG. 10a. For simplicity of representation, a bipolar structure has been chosen, but the opportunity to intensify the additional resistance by a high supply frequency makes multipolar structures preferable. These are similar to that shown, except for the number of poles. As stated, the supply voltage must be at a frequency double the saturation frequency, and this may be imagined to be obtained from a four pole generator G (FIG. 10a) with a rotary armature coaxial to the rotor 2A, not shown in FIG. 10.

One arrangement which has proved useful in intensifying the additional resistance (and in general the alternating current resistance) in the locking stage consists of disposing between the wound poles a like number of auxiliary unwound poles 7, their pole pieces forming an additional path of closure for the dispersed flux through the air gap. This arrangement is preferably associated with those already described (e.g., the use of L section conductors) for preventing the increase in R being accompanied by a reduction in the R/X ratio.

FIG. 11 is a diagrammatic representation of the variation of conductance (or current generated by unit voltage) of the windings of the elementary rectifiers, hereinafter called RS. For simplicity the conductance of each RS is assumed to be a linear function of its coupling to the saturating pole.

For example, in the case of RS1 of FIG. 10 and the direction of rotation of the arrow 106, the coupling begins (and conductance is zero) when the arrow 105 is at 0°. Coupling is total (and conductance reaches its maximum value) when the arrow 105 reaches 45°, corresponding to the air gap arc of the tooth on which RS1 is wound plus that of two adjacent teeth.

The same diagram also shows the supply voltage $V_G$. Even if the state of conduction produced by saturation is bidirectional, the conduction curves are conventionally represented with positive sign for the RS elements of the positive group (1, 2, 3), to distinguish them from those of the negative group (1', 2', 3') which are represented with an opposite sign.

The conductance of the RS elements of the positive conducting group is in series with that of the RS elements of the negative conducting group, and with the load $R_L$, and is therefore equal to the reciprocal of the sum of the reciprocals of the positive and negative ordinates of the diagram.

FIGS. 12a and b show one modification of the form of the RS cores of FIG. 10. In this "jacket" form, the intermediate cores 16 are divided into two half cores 16a and 16b, to enable the half core 16a to become saturated (as it is coupled to an inductor pole) while the other half core 16b is desaturated (as it is decoupled) or vice versa. This has the advantage of reducing the change-over time from the conducting to the locked state or vice versa.

Any other monophase or polyphase rectifying circuit is obtainable in the same manner as that shown in FIG. 10, by disposing about a structure similar to 2a of FIG. 10 and having the desired number of rectifier elements, a set of saturating poles of quantity, size and distance between pole pieces such that at any moment the saturation flux makes contact with all those rectifier elements which the rectifier circuit requires to be conducting at the moment under consideration, and that the locked elements are not contacted by the saturation flux.

In particular, it is evident that the rectifier elements as described in the present invention may be used for rectifying and regulation instead of the saturable regulator reactors RS described in Italian Pat. No. 970,990 "Electronic generation and regulation device," filed on Nov. 17, 1972 in the name of the applicant of the present invention, with the inventor designate the same as for the present invention.

It must be remembered that in all the structures described herein, and generally in all structures according to the invention, those parts of the magnetic circuit adjacent to the conductors RS must be formed from finely laminated cores, of laminations having a low loss figure, in order to limit to a minimum the parasite currents in the iron, which prevent penetration of the transverse flux in the slot, on which the operation of the invention is based. For the same reason, i.e., to increase the transverse dispersed flux, the laminations must preferably be of high permeability. They must also have a hysteresis cycle as close as possible to the theoretical cycle shown in FIG. 13 (narrow rectangular cycle, with low coercive force Hc, characteristic of soft magnetic material) to reduce the control ampere turns needed for attaining saturation induction. Finally the conductors may consist partially or totally of ferromagnetic material, to further increase transverse flux.

A regulation and rectifying function has been obtained in the known art by utilizing the action exerted by an external magnetic field on the superconductivity state of a conductor cooled to a temperature close to absolute zero (J. L. Olsen, "Superconducting rectifier and amplifier," Rev. Sci. Instr. 29,537, 1958 and R. Fasel, J. L. Olsen, "Superconducting rectifiers" from "Low temperatures and electric power," Pergamon Press, 1970). With respect to the present invention, said methods of the known art, besides being based on a completely different physical principle, i.e., the alteration of the superconductivity state by a magnetic field, also require completely different constructional forms from those of the invention, the use of special conductive materials instead of simple copper, complicated auxiliary equipment for cold generation, and all the constructional screening and thermal insulation arrangements used in cryogenics. In contrast, the present invention allows operation with conventional conductive material (copper) at the same operating and ambient temperatures as conventional electrical machines.

What I claim is:

1. A saturable magnetic device for regulating, commutating or converting an electric current, comprising a magnetic circuit including a ferromagnetic laminated core with at least one slot having saturable slot walls, at least one conductor arranged in said slot, said conductor conducting said electric current and having an elongated cross-sectional shape to minimize the conductor inductance and to enhance the conductor added resistance due to stray flux from a current passing through the conductor when the slot walls are unsaturated, means on said core for applying an external magnetic control field to said magnetic circuit to saturate the slot walls and reduce thereby the stray flux and the conductor added resistance according to a prefixed program.

2. A device as claimed in claim 1, wherein said conductor has a cross-section with a narrow appendix disposed in an at least partially open end of the slot, said open end of the slot being spaced by an air gap from a portion of the magnetic circuit to which the external magnetic control field is applied.

3. A device as claimed in claim 1, including two relatively movable magnetic structures, one of said structures comprising energized poles for generating the magnetic control field and the other one of said structures comprising conductor and said ferromagnetic core, means for cyclically coupling and decoupling said magnetic structures in synchronism with the supply frequency of an electric current in the conductor to saturate the slot walls during a fraction of the supply period of said electric current, said slot walls being unsaturated in the remaining fraction of said supply period.

4. A device as claimed in claim 3, including auxiliary unenergized poles alternated with said energized poles of said one magnetic structure, said unenergized poles having pole pieces forming an auxiliary closure path for the stray flux of said conductor when said second magnetic structure is decoupled from the energized poles.

* * * * *